United States Patent
Xu

(10) Patent No.: US 9,650,526 B2
(45) Date of Patent: May 16, 2017

(54) METHOD OF PRINTING A THREE-DIMENSIONAL ARTICLE

(71) Applicant: 3D Systems, Inc., Rock Hill, SC (US)

(72) Inventor: Pingyong Xu, Valencia, CA (US)

(73) Assignee: 3D Systems, Inc., Rock Hill, SC (US)

( * ) Notice: Subject to any disclaimer, the term of this patent is extended or adjusted under 35 U.S.C. 154(b) by 176 days.

(21) Appl. No.: 14/480,959

(22) Filed: Sep. 9, 2014

(65) Prior Publication Data

US 2016/0068696 A1   Mar. 10, 2016

(51) Int. Cl.
| | | |
|---|---|---|
| B29C 35/08 | (2006.01) |
| B29C 41/02 | (2006.01) |
| C09D 11/322 | (2014.01) |
| B29C 67/00 | (2017.01) |
| C08K 3/34 | (2006.01) |
| C08K 3/22 | (2006.01) |
| C09D 11/107 | (2014.01) |
| B33Y 10/00 | (2015.01) |
| B33Y 70/00 | (2015.01) |
| C09D 11/037 | (2014.01) |
| C09D 11/101 | (2014.01) |
| B33Y 80/00 | (2015.01) |
| B29L 9/00 | (2006.01) |

(52) U.S. Cl.
CPC ........ *C09D 11/322* (2013.01); *B29C 67/0055* (2013.01); *B29C 67/0062* (2013.01); *B29C 67/0066* (2013.01); *B33Y 10/00* (2014.12); *B33Y 70/00* (2014.12); *C08K 3/22* (2013.01); *C08K 3/34* (2013.01); *C09D 11/037* (2013.01); *C09D 11/101* (2013.01); *C09D 11/107* (2013.01); *B29L 2009/00* (2013.01); *B33Y 80/00* (2014.12); *C08K 2003/2241* (2013.01); *C08K 2003/2272* (2013.01)

(58) Field of Classification Search
CPC ............ B29C 67/0055; B29C 67/0059; B29C 67/0062; B29C 67/0066; B29C 67/007; B33Y 10/00; B33Y 70/00
USPC ................................. 264/308, 401, 494, 496
See application file for complete search history.

(56) References Cited

U.S. PATENT DOCUMENTS

| | | | | |
|---|---|---|---|---|
| 6,099,787 A | * | 8/2000 | Melisaris ............ | B29C 67/0066 264/401 |
| 2007/0241482 A1 | * | 10/2007 | Giller .................. | B29C 67/0066 264/494 |
| 2011/0190412 A1 | * | 8/2011 | Studer ..................... | G03F 7/031 522/24 |

FOREIGN PATENT DOCUMENTS

| | | |
|---|---|---|
| EP | 1422268 | 5/2004 |
| EP | 2436510 | 4/2012 |
| WO | 97/17190 | 5/1997 |
| WO | 2005/090055 | 9/2005 |

OTHER PUBLICATIONS

PCT International Search Report the International Searching Authority for PCT/US2015/046886, mailed Oct. 27, 2015 (5 pages).
PCT Written Opinion of the International Searching Authority for PCT/US2015/046886, mailed Oct. 27, 2015 (7 pages).
Anonymous: "Metallic Plastic 3D Printing Material Information—Shapeways", www.shapeways.com, Aug. 6, 2014 (Aug. 6, 2014) Retrieved from the Internet: URL: http://wayback.archive.org/web/20140806102414/http://www.shapeways.com/materials/metallic-plastic [retrieved on Oct. 19, 2015] the whole document (6 pages).

* cited by examiner

*Primary Examiner* — Leo B Tentoni

(57) ABSTRACT

In one aspect, composite build materials for use with a 3D printing system are described herein. In some embodiments, a composite build material described herein comprises a carrier ink comprising a curable material; and pigment particles dispersed in the carrier ink, wherein the pigment particles comprise mica. In some cases, the carrier ink is present in the composite build material in an amount of about 80-98% by weight, and the curable material comprises one or more species of monomeric and/or oligomeric (meth) acrylates. Additionally, in some instances, the pigment particles are present in the composite build material in an amount of about 2-8% by weight and comprise up to about 85% by weight mica, based on the total weight of the pigment particles. The pigment particles, in some cases, can also comprise $TiO_2$ and/or $Fe_2O_3$.

15 Claims, No Drawings

METHOD OF PRINTING A THREE-DIMENSIONAL ARTICLE

FIELD

The present invention relates to build materials and, in particular, to build materials having a metallic appearance or surface effect for use with three-dimensional (3D) printing systems.

BACKGROUND

Some commercially available 3D printers, such as the Project™ 3D Printers manufactured by 3D Systems of Rock Hill, S.C., use inks, which are also known as build materials, that are jetted through a print head as a liquid to form various 3D objects or parts. Other 3D printing systems also use a build material that is jetted through a print head. In some instances, the build material is solid at ambient temperatures and converts to liquid at elevated jetting temperatures. In other instances, the build material is liquid at ambient temperatures.

Other 3D printers form 3D articles or objects from a reservoir, vat, or container of a fluid build material or powdered build material. In some cases, a binder material or a laser or other source of energy is used to selectively solidify or consolidate layers of the build material in a stepwise fashion to provide the 3D article.

Build materials for 3D printing systems can include one or more colorants or pigments to provide colored printed parts or printed parts having other optical properties. However, many such build materials fail to provide 3D articles having a reflective or metallic-like finish or appearance. Further, many build materials comprising particulate pigments suffer from poor stability and/or excessive phase separation of components over time, including during use and/or storage of the build material in a 3D printing system.

Therefore, there exists a need for improved build materials for 3D printing, including for the production of 3D objects having a reflective surface and/or a metallic appearance or finish.

SUMMARY

In one aspect, build materials for use with a 3D printer are described herein which, in some embodiments, may offer one or more advantages over prior build materials. In some embodiments, for example, a build material described herein provides printed parts that have a reflective exterior surface and/or a metallic finish or appearance, including without coating or plating the printed part with a metallic material or painting the printed part or otherwise covering the exterior surface defined and formed by the build material. A surface having a "metallic finish or appearance," for reference purposes herein, comprises a surface that resembles a surface of a metal or alloy by visual inspection, such as a surface of one or more of gold, silver, platinum, nickel, stainless steel, aluminum, bronze, copper, or a mixture or combination thereof. The resemblance of the surface of the build material to the surface of the metal can be caused by matching or substantially matching (such as within about 10%, 20%, or 30%) the luster, gloss, diffuse reflection, and/or specular reflection of the two surfaces. For example, in some cases, an exterior surface of a build material described herein having a metallic finish has a metallic or submetallic luster. An exterior surface described herein can also have a pearly luster. Further, a build material described herein can also have a color that approximates, mimics, or substantially matches the color of a metal such as gold or silver. In addition, in some cases, a build material described herein is a curable build material having excellent jettability and/or high colloidal stability.

In some embodiments, a build material for use in a 3D printing system described herein is a composite build material. A composite build material, in some instances, comprises a carrier ink comprising a curable material; and pigment particles dispersed in the carrier ink, wherein the pigment particles comprise mica. In some cases, the carrier ink is present in the composite build material in an amount of about 80-98% by weight, based on the total weight of the composite build material, and the curable material comprises one or more species of (meth)acrylates, including monomeric and/or oligomeric (meth)acrylates. Additionally, in some embodiments, the pigment particles are present in the composite build material in an amount of about 2-8% by weight, based on the total weight of the composite build material. Moreover, in some instances, the pigment particles comprise up to about 85% by weight mica, based on the total weight of the pigment particles. The pigment particles, in some cases, can also comprise $TiO_2$, $Fe_2O_3$, or both.

In addition, a composite build material described herein can further comprise one or more colorants that differ from the pigment particles of the composite build material. For example, in some cases, an additional colorant comprises a molecular dye. In other instances, an additional colorant comprises an additional particulate pigment, including an additional particulate pigment comprising or at least partially formed from mica.

Moreover, in some embodiments, a build material described herein further comprises one or more additives selected from the group consisting of photoinitiators, inhibitors, stabilizing agents, sensitizers, and combinations thereof.

In another aspect, methods of printing a 3D article are described herein. In some embodiments, a method of printing a 3D article comprises selectively depositing layers of a composite build material described herein in a fluid state onto a substrate. For example, in some cases, the composite build material comprises a carrier ink comprising a curable material; and pigment particles dispersed in the carrier ink, wherein the pigment particles comprise mica. Moreover, in some instances, the layers of the composite build material are deposited according to an image of the 3D article in a computer readable format such as a computer aided design (CAD) format. Additionally, in some embodiments, a method described herein can further comprise curing the layers of the composite build material and/or supporting at least one of the layers of the composite build material with a support material.

In other cases, a method of printing a 3D article described herein comprises retaining a composite build material described herein in a fluid state in a container such as a reservoir or vat; and selectively applying energy to the composite build material in the container to solidify a layer of the composite build material, the layer forming a cross-section of the 3D article. In some such instances, a method described herein can further comprise raising or lowering the solidified layer of composite build material to provide a new layer of unsolidified build material at the surface of the fluid build material in the container, followed by again selectively applying energy to the composite build material in the container to solidify the new layer of the composite build material to form a second cross-section of the 3D article. This process can then be repeated a desired number of times to provide the 3D article.

Further, a method of printing a 3D article described herein, in some cases, does not comprise painting, coating, or plating the exterior surface of the article. Thus, as described further hereinbelow, a method described herein can form 3D articles having a metallic finish or surface appearance provided directly by the build material itself, as opposed to being provided by a metal, alloy, or paint disposed or coated on the exterior surface of the build material.

In another aspect, printed 3D articles are described herein. In some embodiments, a printed 3D article is formed from a composite build material described herein, such as a composite build material comprising a carrier ink comprising a curable material; and pigment particles dispersed in the carrier ink, wherein the pigment particles comprise mica. In some instances, a printed 3D article comprises a plurality of stacked layers formed from a build material comprising one or more (meth)acrylates, the layers being bonded to one another in the z-direction; and an exterior surface formed by one or more of the plurality of stacked layers, wherein the surface exhibits a metallic finish. Further, in some cases, the surface exhibits a specular reflectance gloss of at least about 15 gloss units (GU), when measured as described hereinbelow. Moreover, in some embodiments, the exterior surface of the article is not plated or coated with a metal or alloy or painted with a metallic-looking paint.

These and other embodiments are described in greater detail in the detailed description which follows.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, stereolithography, and other techniques now known in the art or that may be known in the future that use a build material or ink to fabricate three-dimensional objects.

I. Composite Build Materials

In one aspect, composite build materials for use with a 3D printer are described herein. In some embodiments, a composite build material described herein comprises a carrier ink comprising a curable material; and pigment particles dispersed in the carrier ink, wherein the pigment particles comprise mica. Moreover, in some cases, a composite build material described herein further comprises a colorant, the colorant differing from the pigment particles of the composite build material. In addition, a composite build material described herein can also comprise one or more additives selected from the group consisting of photoinitiators, inhibitors, stabilizing agents, sensitizers, and combinations thereof.

Turning now to specific components of composite build materials, a composite build material described herein comprises a carrier ink. The carrier ink, in some cases, is present in the composite build material in an amount of about 80-98% by weight, about 85-98% by weight, or about 85-95% by weight, based on the total weight of the composite build material.

Further, in some embodiments, the carrier ink of a composite build material described herein can have a high optical transparency, including in the visible region of the electromagnetic spectrum. In some cases, for instance, the carrier ink has an optical transparency of at least about 70% transmission, at least about 80% transmission, at least about 90% transmission, or at least about 95% transmission between about 350 nm and about 750 nm, at a given thickness, such as a thickness of about 0.01 to 10 mm. In some cases, a carrier ink has a transparency of at least about 98% or at least about 99% transmission between about 350 nm and about 750 nm, at a given thickness, such as a thickness of about 0.01 to 10 mm. Moreover, in some instances, a carrier ink described herein has an optical transparency between about 70% and about 95%, between about 80% and about 99.99%, or between about 90% and about 95% transmission at wavelengths between about 350 nm and about 750 nm, at a given thickness, such as a thickness of 0.1 to 10 mm.

In addition, carrier inks described herein comprise a curable material. The curable material can be present in the carrier ink in any amount not inconsistent with the objectives of the present disclosure. In some cases, the curable material is present in an amount up to about 99% by weight, up to about 95% by weight, up to about 90% by weight, or up to about 80% by weight, based on the total weight of the carrier ink. In some instances, a composite build material described herein comprises about 10-95% by weight, about 20-80% by weight, about 30-70% by weight, or about 70-90% by weight curable material, based on the total weight of the carrier ink.

Moreover, any curable material not inconsistent with the objectives of the present disclosure may be used. In some cases, a curable material comprises one or more polymerizable components. A "polymerizable component," for reference purposes herein, comprises a component that can be polymerized or cured to provide a printed 3D article or object. Polymerizing or curing can be carried out in any manner not inconsistent with the objectives of the present disclosure. In some embodiments, for instance, polymerizing or curing comprises irradiating with electromagnetic radiation having sufficient energy to initiate a polymerization or cross-linking reaction. For instance, in some embodiments, ultraviolet (UV) radiation can be used.

Further, any polymerizable component not inconsistent with the objectives of the present disclosure may be used. In some embodiments, a polymerizable component comprises a monomeric chemical species, such as a chemical species having one or more functional groups or moieties that can react with the same or different functional groups or moieties of another monomeric chemical species to form one or more covalent bonds, such as in a polymerization reaction. Thus, a monomeric chemical species can be a chemical species that can be bonded to other identical chemical species to form a polymer. Moreover, in some instances, a monomeric chemical species is a small molecule or other low molecular weight species that is not itself a polymer or oligomer. A polymerization reaction, in some embodiments, comprises a free radical polymerization, such as that between points of unsaturation, including points of ethylenic unsaturation. In some embodiments, a polymerizable component comprises at least one ethyleneically unsaturated moiety, such as a vinyl group or allyl group. In some cases, a polymerizable component comprises an oligomeric chemical species capable of undergoing additional polymerization, such as through one or more points of unsaturation as described herein. In some embodiments, a curable material comprises one or more monomeric chemical species and one or more oligomeric chemical species described herein. A monomeric chemical species and/or an oligomeric chemical species described herein can have one polymerizable moiety or a plurality of polymerizable moieties.

Further, in some cases, a polymerizable component comprises one or more photo-polymerizable or photo-curable chemical species. A photo-polymerizable chemical species, in some embodiments, comprises a UV-polymerizable chemical species. In some instances, a polymerizable component is photo-polymerizable or photo-curable at wavelengths ranging from about 300 nm to about 450 nm or about 300 nm to about 400 nm. In some cases, a polymerizable component is photo-polymerizable at visible wavelengths of the electromagnetic spectrum.

In some embodiments, a polymerizable component described herein comprises one or more species of (meth) acrylates. As used herein, the term "(meth)acrylate" includes acrylate or methacrylate or mixtures or combinations thereof. In some cases, a polymerizable component comprises a polyester acrylate oligomer, an aliphatic polyester urethane acrylate oligomer, a urethane (meth)acrylate resin, and/or an acrylate amine oligomeric resin. In some embodiments, a UV polymerizable or curable resin or oligomer can comprise any methacrylate or acrylate resin which polymerizes in the presence of a free radical photoinitiator, is thermally stable in an exposed state for at least one week at the jetting temperature and for at least 4 weeks in an enclosed state, and/or has a boiling point greater than the jetting temperature. In some cases, a polymerizable component has a flash point above the jetting temperature.

Urethane (meth)acrylates suitable for use in build materials described herein, in some embodiments, can be prepared in a known manner, typically by reacting a hydroxyl-terminated urethane with acrylic acid or methacrylic acid to give the corresponding urethane (meth)acrylate, or by reacting an isocyanate-terminated prepolymer with hydroxyalkyl acrylates or methacrylates to give the urethane (meth)acrylate. Suitable processes are disclosed, inter alia, in EP-A 114 982 and EP-A 133 908. The weight average molecular weight of such (meth)acrylate oligomers is generally in the range from about 400 to 10,000, or from about 500 to 7000. Urethane (meth)acrylates are also commercially available from the SARTOMER Company under the product names CN980, CN981, CN975, and CN2901, or from Bomar Specialties Co. (Winsted, Conn.) under the product name BR-741. In addition, polyester acrylate oligomers are available commercially from the SARTOMER Company under the product name CN2302.

In some embodiments described herein, a urethane (meth)acrylate or other (meth)acrylate oligomer has a dynamic viscosity ranging from about 140,000 centipoise (cP) to about 160,000 cP at about 50° C. or from about 125,000 cP to about 175,000 cP at about 50° C. when measured in a manner consistent with ASTM D2983. In some cases described herein, a urethane (meth)acrylate oligomer or other (meth)acrylate oligomer has a dynamic viscosity ranging from about 100,000 cP to about 200,000 cP at about 50° C. or from about 10,000 cP to about 300,000 cP at about 50° C. when measured in a manner consistent with ASTM D2983.

Further, in some instances, a polymerizable component comprises one or more low molecular weight materials, such as (meth)acrylates, di(meth)acrylates, and tri(meth)acrylates, which can be used in a variety of combinations. In some embodiments, for example, a polymerizable component comprises one or more of tetrahydrofurfuryl methacrylate, triethylene glycol dimethacrylate, 2-phenoxyethyl methacrylate, lauryl methacrylate, ethoxylated trimethylolpropane triacrylate, tricyclodecane dimethanol diacrylate, 2-phenoxyethylacrylate, triethylene glycol diacrylate, a monofunctional aliphatic urethane acrylate, polypropylene glycol monomethacrylate, polyethylene glycol monomethacrylate, cyclohexane dimethanol diacrylate, and tridecyl methacrylate.

In some cases, a polymerizable component comprises diacrylate and/or dimethacrylate esters of aliphatic, cycloaliphatic or aromatic diols, including 1,3- or 1,4-butanediol, neopentyl glycol, 1,6-hexanediol, diethylene glycol, triethylene glycol, tetraethylene glycol, polyethylene glycol, tripropylene glycol, ethoxylated or propoxylated neopentyl glycol, 1,4-dihydroxymethylcyclohexane, 2,2-bis(4-hydroxycyclohexyl)propane or bis(4-hydroxycyclohexyl) methane, hydroquinone, 4,4'-dihydroxybiphenyl, bisphenol A, bisphenol F, bisphenol S, ethoxylated or propoxylated bisphenol A, ethoxylated or propoxylated bisphenol F or ethoxylated or propoxylated bisphenol S.

A polymerizable component, in some embodiments, comprises one or more tri(meth)acrylates. In some embodiments, tri(meth)acrylates comprise 1,1-trimethylolpropane triacrylate or methacrylate, ethoxylated or propoxylated 1,1,1-trimethylolpropanetriacrylate or methacrylate, ethoxylated or propoxylated glycerol triacrylate, pentaerythritol monohydroxy triacrylate or methacrylate, or tris(2-hydroxy ethyl) isocyanurate triacrylate.

In some cases, a polymerizable component of a build material described herein comprises one or more higher functional acrylates or methacrylates such as dipentaerythritol monohydroxy pentaacrylate or bis(trimethylolpropane) tetraacrylate. In some embodiments, a (meth)acrylate of a build material has a molecular weight ranging from about 250 to 700.

In some cases, a polymerizable component comprises allyl acrylate, allyl methacrylate, methyl (meth)acrylate, ethyl (meth)acrylate, n-propyl (meth)acrylate, n-butyl (meth)acrylate, isobutyl (meth)acrylate, n-hexyl (meth)acrylate, 2-ethylhexyl (meth)acrylate, n-octyl (meth)acrylate, n-decyl (meth)acrylate and n-dodecyl (meth)acrylate, 2-hydroxyethyl (meth)acrylate, 2- and 3-hydroxypropyl (meth) acrylate, 2-methoxyethyl(meth)acrylate, 2-ethoxyethyl (meth)acrylate and 2- or 3-ethoxypropyl (meth)acrylate, tetrahydrofurfuryl methacrylate, 2-(2-ethoxyethoxy)ethyl acrylate, cyclohexyl methacrylate, 2-phenoxyethyl acrylate, glycidyl acrylate, isodecyl acrylate, or a combination thereof.

Additional non-limiting examples of species of polymerizable components useful in some embodiments described herein include the following: isobornyl acrylate (IBOA), commercially available from SARTOMER under the trade name SR 506A; isobornyl methacrylate, commercially available from SARTOMER under the trade name SR 423A; triethylene glycol dimethacrylate, commercially available from SARTOMER under the trade name SR 205; triethylene glycol diacrylate, commercially available from SARTOMER under the trade name SR 272; and tricyclodecane dimethanol diacrylate, commercially available under the trade name SR 833 S.

Composite build materials described herein also comprise pigment particles dispersed in the carrier ink of the composition. In some cases, the pigment particles are present in the composite build material in an amount no greater than about 10% by weight, no greater than about 8% by weight, or no greater than about 5% by weight, based on the total weight of the composite build material. Further, in some embodiments, the pigment particles are present in the composite build material in an amount of at least about 2% by weight, at least about 3% by weight, or at least about 4% by weight, based on the total weight of the composite build material. In some instances, the pigment particles are present in the composite build material in an amount of about 2-10% by weight, 2-8% by weight, 3-8% by weight, 3-6% by weight, 4-10% by weight, 4-8% by weight, 4-6% by weight, or 4-5% by weight, based on the total weight of the composite build material.

The amount of pigment particles in a composite build material described herein, in some embodiments, is selected based on a desired cure depth of the composite build material. In general, the lower the desired cure depth, the higher the amount of pigment particles may be needed to obtain a desired reflectivity or other surface effect, as described further hereinbelow.

Moreover, pigment particles of a composite build material described herein can have any size or shape not inconsistent with the objectives of the present disclosure. In some cases, for instance, the pigment particles have an average diameter or length in one dimension of about 5-500 μm, about 5-200 μm, 5-100 μm, 5-60 μm, 5-30 μm, 10-200 μm, 10-100 μm, or 10-60 μm. In some embodiments, pigment particles can have a flat, plate, flake, or disc-like shape, and the average length or width of the faces of the particles (as opposed to the average thickness of the particles) can have a value described hereinabove. In other cases, pigment particles can be spherical or substantially spherical. Pigment particles may also comprise a mixture of particle shapes. In some such instances, the average diameter or length in one dimension of the pigment particles can be the combined average for all of the pigment particles, regardless of shape. In other cases, the average diameters or lengths described hereinabove may refer to a specific shape of particle in a mixture of differently shaped pigment particles. Additionally, in some instances, pigment particles described herein have an average length described hereinabove in more than one dimension, such as two dimensions or three dimensions. Further, in some cases, an average length or diameter of a population of pigment particles is the mass-median-diameter ($D_{50}$) value of the population.

In addition, pigment particles described herein can have any chemical composition not inconsistent with the objectives of the present disclosure. In some cases, pigment particles comprise mica having the general formula $XY_{2-3}Z_4O_{10}(OH,F)_2$ or $X_2Y_{4-6}Z_8O_{20}(OH,F)_4$, wherein X is K, Na, Ca, Ba, Rb, or Cs, or a combination thereof; Y is Al, Mg, Fe, Mn, Cr, Ti, or Li, or a combination thereof; and Z is Si, Al, a combination of Si and Al, or a combination of Si and/or Al with Fe and/or Ti. Moreover, in some instances, the mica is dioctahedral (Y=4) or trioctahedral (Y=6). Further, it is to be understood that mica can be a sheet silicate or phyllosilicate. Additionally, the mica of pigment particles described herein can comprise a common mica (X=K or Na) or brittle mica (X=Ca). Moreover, in some cases, pigment particles described herein can comprise one or more of biotite, lepidolite, muscovite, phlogopite, zinnwaldite, clintonite, margarite, and glauconite.

Mica can be present in the pigment particles of a composite build material described herein in any amount not inconsistent with the objectives of the present disclosure. In some instances, the pigment particles comprise up to about 95% by weight, up to about 85% by weight, up to about 75% by weight, up to about 65% by weight, up to about 55% by weight, or up to about 45% by weight mica, based on the total weight of the pigment particles. In some embodiments, the pigment particles comprise about 35-100% by weight, 35-95% by weight, 35-90% by weight, 40-100% by weight, 40-90% by weight, 40-80% by weight, 40-75% by weight, 40-65% by weight, 40-55% by weight, 50-100% by weight, 50-90% by weight, 50-85% by weight, 50-75% by weight, 50-60% by weight, 60-100% by weight, 60-90% by weight, or 60-80% by weight mica, based on the total weight of the pigment particles. Moreover, in some cases, all or substantially all of the pigment particles of a composite build material described herein are formed from mica.

It is also possible, in some embodiments, for the pigment particles to further comprise materials other than mica. For example, in some instances, the pigment particles of a composite build material described herein further comprise $TiO_2$, $Fe_2O_3$, or both. In some cases, pigment particles described herein comprise up to about 65% by weight, up to about 55% by weight, up to about 50% by weight, up to about 45% by weight, up to about 40% by weight, up to about 35% by weight, or up to about 30% by weight $TiO_2$ and/or $Fe_2O_3$, based on the total weight of the pigment particles. In some embodiments, pigment particles described herein comprise about 10-65% by weight, 15-65% by weight, 20-65% by weight, 20-60% by weight, 25-60% by weight, 30-65% by weight, 30-55% by weight, or 30-50% by weight $TiO_2$ and/or $Fe_2O_3$, based on the total weight of the pigment particles.

Pigment particles described herein, in some embodiments, may also comprise ground particles, such as wet-ground particles, having a size, shape, and/or chemical composition described hereinabove. Non-limiting examples of pigment particles suitable for use in some embodiments of composite build materials described herein include the "pearlescent" and "metallic pearlescent" pigments available from SUN Chemical Corporation (Parsippany, N.J.) under the trade names SunPEARL, SunMICA, SunGEM, and/or SunSHINE.

A composite build material described herein, in some cases, further comprises one or more colorants differing from the pigment particles of the composite build material. Any colorant not inconsistent with the objectives of the present disclosure may be used. For example, in some embodiments, an additional colorant of a composite build material described herein can be a particulate colorant, such as a particulate pigment, or a molecular colorant, such as a molecular dye. Any such particulate or molecular colorant not inconsistent with the objectives of the present disclosure may be used. In some cases, for instance, the colorant of a composite build material comprises an inorganic pigment, such as $TiO_2$ and ZnO. The additional colorant of a composite build material may also comprise mica, including mica particles. Thus, in some cases, a composite build material described herein can comprise first pigment particles comprising mica and second pigment particles comprising mica, wherein the first and second pigment particles differ.

The use of one or more additional colorants in combination with pigment particles comprising mica described herein can, in some embodiments, provide a composite build material and/or a 3D printed article formed from the composite build material having a desired color and also a desired surface effect, such as a desired metallic finish or reflectivity or gloss. In general, any combination of color and surface effect not inconsistent with the objectives of the present disclosure may be provided by a composite build material described herein. In some instances, for example, one or more colorants of a composite build material described herein comprises a colorant for use in a RGB, sRGB, CMY, CMYK, L*a*b*, or Pantone® colorization scheme. A "color" of a composite build material and/or printed article can be described according to a chromaticity diagram or color space such as the CIE 1931 color space chromaticity diagram. In some instances, one or more additional colorants of a composite build material described herein exhibits a white color. In other cases, an additional colorant exhibits a black color.

Further, in some cases, one or more colorants of a composite build material described herein are selected to approximate or mimic a color and/or surface appearance of a metal or a mixture or combination or alloy of metals, such as gold, silver, platinum, nickel, stainless steel, aluminum, bronze, copper, or a mixture or combination thereof. The amount of one or more additional colorants described herein can also be selected to provide a desired color and/or surface effect to a composite build material and/or a 3D article formed from the composite build material. In some instances, for example, an additional colorant described herein is present in a composite build material in an amount no greater than about 2% by weight, no greater than about 1.5% by weight, or no greater than about 1% by weight, based on the total weight of the composite build material. In some embodiments, the additional colorant is present in the composite build material in an amount of about 0.005-2% by weight, 0.01-2% by weight, 0.01-1.5% by weight, 0.01-1% by weight, 0.01-0.5% by weight, 0.1-2% by weight, 0.1-1% by weight, 0.1-0.5% by weight, or 0.5-1.5% by weight, based on the total weight of the composite build material.

Other components of a composite build material described herein may also be selected to provide a composite build material and/or a 3D printed article having a desired color and/or surface effect, including a color and/or surface effect that can approximate or mimic the appearance of a metal such as gold, silver, platinum, nickel, stainless steel, aluminum, bronze, or copper. In some embodiments, for example, a metallic gold appearance can be provided by a composite build material described herein, wherein the carrier ink is present in the composite build material in an amount of about 85-98% by weight, based on the total weight of the composite build material; the curable material comprises a mixture of 45-55% by weight of one or more monomeric (meth)acrylates and 45-55% by weight of one or more oligomeric urethane (meth)acrylates, based on the total weight of the curable material; the pigment particles are present in the composite build material in an amount of about 2-8% by weight, based on the total weight of the composite build material; the pigment particles have an average diameter of about 5-500 µm and comprise up to about 85% by weight mica, based on the total weight of the pigment particles; the pigment particles exhibit a gold color; the colorant is present in the composite build material in an amount of about 0.1-2.0% by weight, based on the total weight of the composite build material; and the colorant exhibits a white color.

Similarly, in other instances, a metallic silver appearance can be provided by a composite build material described herein, wherein the carrier ink is present in the composite build material in an amount of about 85-98% by weight, based on the total weight of the composite build material; the curable material comprises a mixture of 45-55% by weight of one or more monomeric (meth)acrylates and 45-55% by weight of one or more oligomeric urethane (meth)acrylates, based on the total weight of the curable material; the pigment particles are present in the composite build material in an amount of about 2-8% by weight, based on the total weight of the composite build material; the pigment particles have an average diameter of about 5-500 µm and comprise up to about 85% by weight mica, based on the total weight of the pigment particles; the pigment particles exhibit a white color; and the colorant comprises a black colorant and is present in the composite build material in an amount of about 0.005-0.05% by weight, based on the total weight of the composite build material.

It is further to be understood that a color and/or surface effect such as a metallic finish or appearance described herein can be provided directly by the composite build material itself, as opposed to being provided by an additional material applied to the surface of the composite build material. For example, a color and/or surface effect described herein, in some cases, can be exhibited by an exterior surface of a 3D article that is defined or formed by a composite build material described herein, as opposed to being an exterior surface defined or formed by a coating applied to the composite build material. Therefore, in some embodiments, a 3D article formed by a composite build material described herein can have an unpainted, uncoated, and/or unplated exterior surface that nevertheless exhibits a color and/or surface effect described herein. Moreover, in some cases, such an exterior surface can have a thickness of at least about 50 µm, at least about 100 µm, at least about 500 µm, at least about 1 mm, at least about 5 mm, or at least about 10 mm, such that the 3D article has a chemical composition that is unchanging or monolithic or substantially unchanging or monolithic over a distance of at least about 50 µm, 100 µm, 500 µm, 1 mm, 5 mm, or 10 mm below the exterior surface.

Composite build materials described herein, in some instances, further comprise one or more additives, such as one or more additives selected from the group consisting of photoinitiators, inhibitors, stabilizing agents, sensitizers, and combinations thereof. For example, in some embodiments, a build material further comprises one or more photoinitiators. Any photoinitiator not inconsistent with the objectives of the present disclosure can be used. In some cases, a photoinitiator comprises an alpha-cleavage type (unimolecular decomposition process) photoinitiator or a hydrogen abstraction photosensitizer-tertiary amine synergist, operable to absorb light preferably between about 250 nm and about 450 nm or between about 300 nm and about 385 nm, to yield free radical(s). Examples of alpha cleavage photoinitiators are Irgacure 184 (CAS 947-19-3), Irgacure 369 (CAS 119313-12-1), and Irgacure 819 (CAS 162881-26-7). An example of a photosensitizer-amine combination is Darocur BP (CAS 119-61-9) with diethylaminoethylmethacrylate.

In some instances, suitable photoinitiators comprise benzoins, including benzoin, benzoin ethers, such as benzoin methyl ether, benzoin ethyl ether and benzoin isopropyl ether, benzoin phenyl ether and benzoin acetate, acetophenones, including acetophenone, 2,2-dimethoxyacetophenone and 1,1-dichloroacetophenone, benzil, benzil ketals, such as benzil dimethyl ketal and benzil diethyl ketal, anthraquinones, including 2-methylanthraquinone, 2-ethylanthraquinone, 2-tert-butylanthraquinone, 1-chloroanthraquinone and 2-amylanthraquinone, triphenylphosphine, benzoylphosphine oxides, for example 2,4,6-trimethylbenzoyldiphenylphosphine oxide (Lucirin TPO), benzophenones, such as benzophenone and 4,4'-bis(N,N'-dimethylamino)benzophenone, thioxanthones and xanthones, acridine derivatives, phenazine derivatives, quinoxaline derivatives or 1-phenyl-1,2-propanedione, 2-O-benzoyl oxime, 1-aminophenyl ketones or 1-hydroxyphenyl ketones, such as 1-hydroxycyclohexyl phenyl ketone, phenyl 1-hydroxyisopropyl ketone and 4-isopropylphenyl 1-hydroxyisopropyl ketone.

Additionally, in some embodiments, suitable photoinitiators comprise those operable for use with a HeCd laser radiation source, including acetophenones, 2,2-dialkoxybenzophenones and 1-hydroxyphenyl ketones, such as 1-hydroxycyclohexyl phenyl ketone or 2-hydroxyisopropyl phenyl ketone (=2-hydroxy-2,2-dimethylacetophenone). Suitable photoinitiators can also comprise those operable for use with an Ar laser radiation source including benzil ketals, such as benzil dimethyl ketal. In some cases, a photoinitiator comprises an α-hydroxyphenyl ketone, benzil dimethyl ketal or 2,4,6-trimethylbenzoyldiphenylphosphine oxide or a mixture thereof.

Another class of suitable photoinitiators, in some instances, comprises ionic dye-counter ion compounds capable of absorbing actinic radiation and generating free radicals for polymerization initiation. In some embodiments, build materials containing ionic dye-counter ion compounds can be cured more variably with visible light within the adjustable wavelength range of about 400 nm to about 700 nm. Ionic dye-counter ion compounds and their mode of operation are disclosed in EP-A-0 223 587 and U.S. Pat. Nos. 4,751,102; 4,772,530; and 4,772,541.

A photoinitiator can be present in a composite build material described herein in any amount not inconsistent with the objectives of the present disclosure. In some embodiments, a photoinitiator is present in a composite build material in an amount of up to about 5% by weight, based on the total weight of the composite build material. In some cases, a photoinitiator is present in an amount of about 0.1-5% by weight.

In addition, a composite build material described herein can further comprise one or more sensitizers. A sensitizer can be added to a build material to increase the effectiveness of one or more photoinitiators that may also be present. Any sensitizer not inconsistent with the objectives of the present disclosure may be used. In some embodiments, a sensitizer comprises isopropylthioxanthone (ITX) or 2-chlorothioxanthone (CTX). Other sensitizers may also be used.

A sensitizer can be present in a composite build material in any amount not inconsistent with the objectives of the present disclosure. In some embodiments, a sensitizer is present in an amount ranging of about 0.1-2% by weight or about 0.5-1% by weight, based on the total weight of the composite build material.

A composite build material described herein can also comprise one or more polymerization inhibitors or stabilizing agents. A polymerization inhibitor can be added to a build material to provide additional thermal stability to the composition. Any polymerization inhibitor not inconsistent with the objectives of the present disclosure may be used. In some cases, a polymerization inhibitor comprises methoxyhydroquinone (MEHQ). A stabilizing agent, in some instances, comprises one or more anti-oxidants. Any anti-oxidant not inconsistent with the objectives of the present disclosure may be used. In some embodiments, for example, suitable anti-oxidants include various aryl compounds, including butylated hydroxytoluene (BHT), which can also be used as a polymerization inhibitor in some embodiments described herein.

A polymerization inhibitor and/or a stabilizing agent can be present in a composite build material in any amount not inconsistent with the objectives of the present disclosure. In some embodiments, a polymerization inhibitor is present in an amount of about 0.1-2% by weight or 0.5-1% by weight, based on the total weight of the composite build material. Further, in some cases, a stabilizing agent is present in a composite build material described herein in an amount of about 0.1-5% by weight, about 0.5-4% by weight, or about 1-3% by weight, based on the total weight of the composite build material.

Composite build materials described herein can also exhibit a variety of desirable properties. For example, a composite build material described herein can have any freezing point, melting point, and/or other phase transition temperature not inconsistent with the objectives of the present disclosure. In some cases, a composite build material has freezing and melting points consistent with temperatures used in some 3D printing systems, including 3D printing systems designed for use with phase changing build materials. In some embodiments, the freezing point of a composite build material is greater than about 40° C. In some instances, for example, a composite build material has a freezing point centered at a temperature ranging from about 45° C. to about 55° C. or from about 50° C. to about 80° C. In some cases, a build material has a freezing point below about 40° C. or below about 30° C.

Further, in some embodiments described herein, a composite build material exhibits a sharp freezing point or other phase transition. In some cases, for instance, a build material freezes over a narrow range of temperatures, such as a range of about 1-10° C., about 1-8° C., or about 1-5° C. In some embodiments, a build material having a sharp freezing point freezes over a temperature range of X±2.5° C., where X is the temperature at which the freezing point is centered (e.g., X=65° C.).

In addition, a composite build material described herein, in some cases, is fluid at jetting temperatures encountered in 3D printing systems. Moreover, in some embodiments, a composite build material solidifies once deposited on a surface during the fabrication of a three-dimensionally printed article or object. Alternatively, in other instances, a composite build material remains substantially fluid upon deposition on a surface. Solidification of a composite build material, in some embodiments, occurs through a phase change of the composite build material or a component of the composite build material. The phase change can comprise a liquid to solid phase change or a liquid to semi-solid phase change. Further, in some instances, solidification of a composite build material comprises an increase in viscosity of the composite build material, such as an increase in viscosity from a low viscosity state to a high viscosity state, as described further hereinbelow.

Additionally, in some embodiments, a composite build material described herein, when non-cured, has a viscosity profile consistent with the requirements and parameters of one or more 3D printing systems. In some cases, for example, a build material described herein has a dynamic viscosity ranging from about 8.0 cP to about 14.0 cP at a temperature of about 80° C. when measured according to ASTM standard D2983 (e.g., using a Brookfield Model DV-II+ Viscometer). In some embodiments, a build material has a dynamic viscosity of about 9.5-12.5 cP or about 10.5-12.5 cP at a temperature of about 80° C. In some cases, a composite build material has a viscosity of about 8.0-10.0 cP at a temperature of about 85-87° C. In some embodiments, a composite build material described herein has a dynamic viscosity of about 8.0-19.0 cP, about 8.0-13.5 cP, about 11.0-14.0 cP, about 11.5-13.5 cP, or about 12.0-13.0 cP at a temperature of about 65° C., when measured according to ASTM standard D2983. In some instances, a composite build material described herein when non-cured exhibits a dynamic viscosity of about 100-1000 cP, about 200-900 cP, about 300-900 cP, about 300-800 cP, about 400-1000 cP, about 400-900 cP, about 400-800 cP, about 400-600 cP, about 450-550 cP, about 500-700 cP, about 500-600 cP, or about 500-550 cP at 30° C., when measured according to ASTM D2983. In some cases, a composite build material described herein when non-cured exhibits a dynamic viscosity of less than about 100 cP or more than about 1000 cP, when measured according to ASTM D2983.

Further, composite build materials described herein, in some embodiments, can exhibit a combination of one or more desirable features. In some cases, for instance, a composite build material in the non-cured state has one or more of the following properties:

1. Freezing point below about 30° C., below about 25° C., or below about 15° C.;
2. Viscosity of about 8-16 cP at 70-95° C. or about 500-700 cP at 25-35° C.; and
3. Thermal stability for at least 6 months at room temperature (25° C.). Viscosity can be measured according to ASTM D2983 (e.g., using a Brookfield Model DV-II+ Viscometer). In addition, for reference purposes herein, a thermally stable material exhibits no greater than about a 35 percent change in viscosity over a specified time period (e.g., 3 days) when measured at the specified temperature (e.g., room temperature) at the beginning and at the end of the time period. In some embodiments, the viscosity change is no greater than about 30 percent or no greater than about 20 percent, based on the larger viscosity value. In some cases, the viscosity change is between about 10 percent and about 20 percent or between about 25 percent and about 30 percent. Moreover, in some embodiments, the change in viscosity is an increase in viscosity.

Further, a composite build material described herein in a cured state, in some embodiments, can exhibit one or more desired properties. A composite build material in a "cured" state can comprise a build material that includes a curable material or polymerizable component that has been at least partially polymerized and/or cross-linked. For instance, in some instances, a cured build material is at least about 10% polymerized or cross-linked or at least about 30% polymerized or cross-linked. In some cases, a cured build material is at least about 50%, at least about 70%, at least about 80%, or at least about 90% polymerized or cross-linked. A cured build material can also be between about 10% and about 99% polymerized or cross-linked.

In addition, in some embodiments, a surface of a composite build material described herein, when cured, exhibits a specular reflectance gloss of at least about 15 gloss units (GU), at least about 20 GU, at least about 25 GU, at least about 30 GU, or at least about 35 GU, when measured as described hereinbelow. In some cases, a surface of a composite build material described herein, when cured, exhibits a specular reflectance gloss between about 15 GU and about 50 GU, between about 15 GU and about 45 GU, between about 15 GU and about 40 GU, between about 20 GU and about 40 GU, or between about 20 GU and about 35 GU. Composite build materials having specular reflectance gloss values described herein can exhibit reflective surfaces that, in some embodiments, can approximate or mimic the reflectivity of a metal surface, thereby permitting 3D articles formed from the composite build material to have a metallic appearance.

Composite build materials described herein can be produced in any manner not inconsistent with the objectives of the present disclosure. In some embodiments, for instance, a method for the preparation of a composite build material described herein comprises the steps of mixing all or substantially all of the components of the composite build material, melting the mixture, and filtering the molten mixture. Melting the mixture, in some embodiments, is carried out at a temperature of about 75° C. or in a range from about 75° C. to about 85° C. In some embodiments, a build material described herein is produced by placing all or substantially all components of the build material in a reaction vessel and heating the resulting mixture to a temperature ranging from about 75° C. to about 85° C. with stirring. The heating and stirring are continued until the mixture attains a substantially homogenized molten state. In general, the molten mixture can be filtered while in a flowable state to remove any large undesirable particles that may interfere with jetting. The filtered mixture is then cooled to ambient temperatures until it is heated in the ink jet printer. Alternatively, in some cases, the pigment particles of the composite build material are not combined with the other components for melting, mixing, and filtering. Instead, in some instances, the pigment particles are subsequently mixed with the filtered mixture of the other components.

II. Methods of Printing a 3D Article

In another aspect, methods of printing a 3D article or object are described herein. Methods of printing a 3D article or object described herein can include forming the 3D article from a plurality of layers of a composite build material described herein in a layer-by-layer manner. Any composite build material described hereinabove in Section I may be used. For example, in some cases, the composite build material comprises a carrier ink comprising a curable material and pigment particles dispersed in the carrier ink, wherein the pigment particles comprise mica. Further, the layers of a composite build material can be deposited according to an image of the 3D article in a computer readable format. In some embodiments, the build material is deposited according to preselected computer aided design (CAD) parameters. Moreover, in some cases, one or more layers of a composite build material described herein has a thickness of about 10 µm to about 100 µm, about 10 µm to about 80 µm, about 10 µm to about 50 µm, about 20 µm to about 100 µm, about 20 µm to about 80 µm, or about 20 µm to about 40 µm. Other thicknesses are also possible.

Additionally, it is to be understood that methods of printing a 3D article described herein can include so-called "multi-jet" or "stereolithography" 3D printing methods. For example, in some instances, a multi-jet method of printing a 3D article comprises selectively depositing layers of a composite build material described herein in a fluid state onto a substrate, such as a build pad of a 3D printing system. In addition, in some embodiments, a method described herein further comprises supporting at least one of the layers of the composite build material with a support material. Any support material not inconsistent with the objectives of the present invention may be used.

A method described herein can also comprise curing the layers of the composite build material. For example, in some instances, a method of printing a 3D article described herein further comprises subjecting the composite build material to electromagnetic radiation of sufficient wavelength and intensity to cure the build material, where curing can comprise polymerizing one or more polymerizable functional groups of one or more components of the build material. In some cases, a layer of deposited build material is cured prior to the deposition of another or adjacent layer of build material.

Further, in some embodiments, a preselected amount of composite build material described herein is heated to the appropriate temperature and jetted through the print head or a plurality of print heads of a suitable inkjet printer to form a layer on a print pad in a print chamber. In some cases, each layer of build material is deposited according to the preselected CAD parameters. A suitable print head to deposit the build material, in some embodiments, is the piezoelectric Z850 print head. Additional suitable print heads for the deposition of build material and support material described herein are commercially available from a variety of ink jet printing apparatus manufacturers. For example, the Xerox print head or Ricoh print heads may also be used in some instances.

Moreover, the composite build material, in some instances, can be deposited from a reservoir or cartridge of the 3D printing system, wherein the reservoir or cartridge contains less than 100 g, less than 75 g, or less than 50 g of composite build material. In some cases, the reservoir or cartridge contains about 10-100 g, 10-80 g, 10-60 g, 20-100 g, 20-80 g, 20-60 g, 30-100 g, 30-80 g, 30-60 g, or 30-50 g of composite build material. The use of reservoirs or cartridges having a size recited herein, in some cases, can permit substantial redispersion of any build material components described herein that may settle or phase separate during storage and/or use of the reservoirs or cartridges.

Additionally, in some embodiments, a composite build material described herein remains substantially fluid upon deposition. Alternatively, in other instances, the build material exhibits a phase change upon deposition and/or solidifies upon deposition. Moreover, in some cases, the temperature of the printing environment can be controlled so that the jetted droplets of build material solidify on contact with the receiving surface. In other embodiments, the jetted droplets of build material do not solidify on contact with the receiving surface, remaining in a substantially fluid state. Additionally, in some instances, after each layer is deposited, the deposited material is planarized and cured with electromagnetic (e.g., UV) radiation prior to the deposition of the next layer. Optionally, several layers can be deposited before planarization and curing, or multiple layers can be deposited and cured followed by one or more layers being deposited and then planarized without curing. Planarization corrects the thickness of one or more layers prior to curing the material by evening the dispensed material to remove excess material and create a uniformly smooth exposed or flat up-facing surface on the support platform of the printer. In some embodiments, planarization is accomplished with a wiper device, such as a roller, which may be counter-rotating in one or more printing directions but not counter-rotating in one or more other printing directions. In some cases, the wiper device comprises a roller and a wiper that removes excess material from the roller. Further, in some instances, the wiper device is heated. It should be noted that the consistency of the jetted build material described herein prior to curing, in some embodiments, should desirably be sufficient to retain its shape and not be subject to excessive viscous drag from the planarizer.

Moreover, a support material, when used, can be deposited in a manner consistent with that described hereinabove for the build material. The support material, for example, can be deposited according to the preselected CAD parameters such that the support material is adjacent or continuous with one or more layers of the build material. Jetted droplets of the support material, in some embodiments, solidify or freeze on contact with the receiving surface. In some cases, the deposited support material is also subjected to planarization.

Layered deposition of the composite build material and support material can be repeated until the 3D article has been formed. In some embodiments, a method of printing a 3D article further comprises removing the support material from the build material.

As described above, it is also possible to form a 3D article from a composite build material described herein using stereolithography. For example, in some cases, a method of printing a 3D article comprises retaining a composite build material described herein in a fluid state in a container and selectively applying energy to the composite build material in the container to solidify at least a portion of a fluid layer of the composite build material, thereby forming a solidified layer that defines a cross-section of the 3D article. Additionally, a method described herein can further comprise raising or lowering the solidified layer of composite build material to provide a new or second fluid layer of unsolidified build material at the surface of the fluid build material in the container, followed by again selectively applying energy to the composite build material in the container to solidify at least a portion of the new or second fluid layer of the composite build material to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying the build material. Moreover, selectively applying energy to the composite build material in the container can comprise applying electromagnetic radiation, such as UV radiation, having a sufficient energy to cure the build material. In some cases, the curing radiation is provided by a computer controlled laser beam. In addition, in some cases, raising or lowering a solidified layer of composite build material is carried out using an elevator platform disposed in the container of fluid build material. A method described herein can also comprise planarizing a new layer of fluid build material provided by raising or lowering an elevator platform. Such planarization can be carried out, in some cases, by a wiper or roller.

It is further to be understood that the foregoing process can be repeated a desired number of times to provide the 3D article. For example, in some cases, this process can be repeated n number of times, wherein n can be up to about 100,000, up to about 50,000, up to about 10,000, up to about 5000, up to about 1000, or up to about 500. Thus, in some embodiments, a method of printing a 3D article described herein can comprise selectively applying energy to a composite build material in a container to solidify at least a portion of an nth fluid layer of the composite build material, thereby forming an nth solidified layer that defines an nth cross-section of the 3D article, raising or lowering the nth solidified layer of composite build material to provide an (n+1)th layer of unsolidified build material at the surface of the fluid build material in the container, selectively applying energy to the (n+1)th layer of composite build material in the container to solidify at least a portion of the (n+1)th layer of the composite build material to form an (n+1)th solidified layer that defines an (n+1)th cross-section of the 3D article, raising or lowering the (n+1)th solidified layer of composite build material to provide an (n+2)th layer of unsolidified build material at the surface of the fluid build material in the container, and continuing to repeat the foregoing steps to form the 3D article. Further, it is to be understood that one or more steps of a method described herein, such as a step of selectively applying energy to a layer of composite build material, can be carried out according to an image of the 3D article in a computer-readable format. General methods of 3D printing using stereolithography are further described, inter alia, in U.S. Pat. Nos. 5,904,889 and 6,558,606.

In addition, in some embodiments described herein, the container holding the fluid composite build material can be a container configured to contain less than 100 g, less than 75 g, or less than 50 g of composite build material. In some cases, the container contains about 10-100 g, 10-80 g, 10-60 g, 20-100 g, 20-80 g, 20-60 g, 30-100 g, 30-80 g, 30-60 g, or 30-50 g of composite build material. The use of containers having a size recited herein, in some cases, can permit substantial redispersion of any build material components described herein that may settle or phase separate during storage and/or use of the container.

Moreover, a "multi-jet" or "stereolithography" 3D printing method described herein, in some instances, does not comprise painting, coating, or plating the exterior surface of the article following printing. Thus, a method of making a 3D article described herein can form 3D articles having a metallic finish or surface appearance that is provided directly by the build material itself, as opposed to being provided by a metal, alloy, or paint disposed or coated onto the exterior surface of the build material in a post-processing step.

III. 3D Printed Articles

In another aspect, printed 3D articles are described herein. In some embodiments, a printed 3D article is formed from a composite build material described herein. Any composite build material described hereinabove in Section I may be used. For example, in some cases, the composite build material comprises a carrier ink comprising a curable material and pigment particles dispersed in the carrier ink, wherein the pigment particles comprise mica. Other composite build materials described hereinabove in Section I may also be used.

As described herein, such a composite build material, in some embodiments, can be used to form a 3D article having a reflective surface and/or metallic finish. Moreover, the metallic finish and/or reflectivity of the surface can be provided by the composite build material itself, rather than by a paint, coating, or plating disposed on the surface of the composite build material. Therefore, in some embodiments, a 3D article formed by a composite build material described herein can have an unpainted, uncoated, unplated, and/or "as printed" exterior surface that nevertheless exhibits a color, reflectivity, and/or metallic finish described herein. In particular, in some cases, such a 3D article is not a metal-plated or metal-coated article. Instead, in some embodiments, the exterior surface of the article is not plated or coated with a metal, where a "metal" can include an elemental metal or a mixture or alloy of a plurality of metals. Further, in some cases, such an exterior surface can have a thickness of at least about 50 µm, at least about 100 µm, at least about 500 µm, at least about 1 mm, at least about 5 mm, or at least about 10 mm, such that the 3D article has a chemical composition that is unchanging or monolithic or substantially unchanging or monolithic over a distance of at least about 50 µm, 100 µm, 500 µm, 1 mm, 5 mm, or 10 mm below the exterior surface.

In some cases, a printed 3D article described herein comprises a plurality of stacked layers formed from a build material comprising one or more (meth)acrylates, wherein the layers are bonded or adhered to one another in the z-direction, and wherein one or more of the stacked layers forms an exterior surface of the article. In some instances, the layers are bonded or adhered to one another in the z-direction with a lower binding energy or adhesion force than exhibited by the layers in the (xy-) plane normal to the z-direction. Further, the exterior surface of the article can exhibit metallic finish and/or a specular reflectance gloss value described hereinabove, such as a specular reflectance gloss of at least about 15 GU, at least about 20 GU, at least about 25 GU, at least about 30 GU, or at least about 35 GU. Further, an exterior surface of a 3D article described herein can comprise a continuous surface, a faceted surface, or a curved surface. More generally, it is to be understood that a 3D article described herein can have any size and shape not inconsistent with the objectives of the present disclosure.

Some embodiments described herein are further illustrated in the following non-limiting examples.

Examples

Composite Build Materials

Composite build materials according to some embodiments described herein were prepared as follows. First, for each of Examples 1-10, the curable materials and photoinitiators provided in Tables I and II below were charged into a vessel equipped with mechanical stirring and a heating unit. The mixture was then heated to about 80-90° C. After the mixture was melted, stirring was begun, and the mixture was blended for about 1-2 hours at 80-90° C. The liquid was then filtered with a 1 micron filter to remove solid particles. Next, the pigment particles and colorants provided in Tables I and II were mixed into the liquid with stirring to provide the composite build materials. Table I provides weight percents of the various components of the composite build materials, and Table II provides the identities of the various components for each of Examples 1-10. The build materials of Examples 1-10 exhibited dynamic viscosities of 100-700 cP at 30° C., when measured according to ASTM D2983 using a Brookfield Viscometer (Model RVT, spindle 15 at 50 rpm).

The composite build materials were disposed in a ProJet 1200 System from 3D Systems and used to form 3D articles at room temperature. Specifically, rings and other jewelry articles were formed using the composite build materials. Curing was carried out using a UV exposure time of 6-8 seconds at a power of 1-5 mW. The articles formed from the cured build materials exhibited reflective surfaces resembling metallic gold or silver surfaces.

To measure the reflectivity of exterior surfaces formed from the composite build materials, the specular reflectance gloss of planar exterior surfaces was measured using a BYK Gardner Micro-Tri-Gloss Gloss Meter. Specifically, the gloss measurements were carried out at an angle of 85 degrees in accordance with ASTM D523-14 using a polished black glass surface as an external standard. Results for Examples 5-10 are provided in Table III below.

TABLE I

Composite Build Material Compositions

|  | Curable Material | Pigment Particles | Colorant | Photoinitiator |
|---|---|---|---|---|
| Example 1 | 92.43 | 4.76 | 0.02 | 2.80 |
| Example 2 | 92.98 | 4.21 | — | 2.81 |
| Example 3 | 92.24 | 4.92 | 0.01 | 2.82 |
| Example 4 | 92.91 | 3.34 | 0.90 | 2.85 |
| Example 5 | 95.69 | 1.5 | 0.01 | 2.8 |
| Example 6 | 94.19 | 3.0 | 0.01 | 2.8 |
| Example 7 | 92.69 | 4.5 | 0.01 | 2.8 |
| Example 8 | 94.8 | 1.5 | 0.90 | 2.8 |
| Example 9 | 93.3 | 3.0 | 0.90 | 2.8 |
| Example 10 | 91.8 | 4.5 | 0.90 | 2.8 |

TABLE II

Composite Build Material Components

|  | Curable Material | Pigment Particles | Colorant | Photoinitiator |
|---|---|---|---|---|
| Example 1 | 30/70 mixture of (1) urethane methacrylate/polyester acrylate oligomer and (2) diacrylate monomer | SunSHINE Super White | 9B898 Black Paste (Penn Color Inc., Doylestown, PA, USA) | 80/20 mixture of Lucirin TPO and Irgacure 184 |
| Example 2 | 30/70 mixture of (1) urethane methacrylate/polyester acrylate oligomer and (2) diacrylate monomer | SunPURO Gold | — | 80/20 mixture of Lucirin TPO and Irgacure 184 |
| Example 3 | 50/50 mixture of (1) urethane methacrylate oligomer and (2) diacrylate monomer | SunSHINE Super White | 9B898 Black Paste | 80/20 mixture of Lucirin TPO and Irgacure 184 |
| Example 4 | 50/50 mixture of (1) urethane methacrylate oligomer and (2) diacrylate monomer | SunPURO Gold | SunSHINE Super White | 80/20 mixture of Lucirin TPO and Irgacure 184 |
| Example 5 | 50/50 mixture of (1) urethane methacrylate oligomer and (2) diacrylate monomer | SunSHINE Super White | 9B898 Black Paste | 80/20 mixture of Lucirin TPO and Irgacure 184 |
| Example 6 | 50/50 mixture of (1) urethane methacrylate oligomer and (2) diacrylate monomer | SunSHINE Super White | 9B898 Black Paste | 80/20 mixture of Lucirin TPO and Irgacure 184 |
| Example 7 | 50/50 mixture of (1) urethane methacrylate oligomer and (2) diacrylate monomer | SunSHINE Super White | 9B898 Black Paste | 80/20 mixture of Lucirin TPO and Irgacure 184 |
| Example 8 | 50/50 mixture of (1) urethane methacrylate oligomer and (2) diacrylate monomer | SunPURO Gold | SunSHINE Super White | 80/20 mixture of Lucirin TPO and Irgacure 184 |
| Example 9 | 50/50 mixture of (1) urethane methacrylate oligomer and (2) diacrylate monomer | SunPURO Gold | SunSHINE Super White | 80/20 mixture of Lucirin TPO and Irgacure 184 |
| Example 10 | 50/50 mixture of (1) urethane methacrylate oligomer and (2) diacrylate monomer | SunPURO Gold | SunSHINE Super White | 80/20 mixture of Lucirin TPO and Irgacure 184 |

TABLE III

Specular Reflectance Gloss of Composite Build Materials

| Composite Build Material | Gloss (GU) |
|---|---|
| Example 5 | 20 |
| Example 6 | 24 |
| Example 7 | 30 |
| Example 8 | 25 |
| Example 9 | 29 |
| Example 10 | 36 |

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. A method of printing a three-dimensional article comprising:

retaining a composite build material in a fluid state in a container;

selectively applying energy to the composite build material in the container to solidify at least a portion of a first fluid layer of the composite build material, thereby forming a first solidified layer that defines a first cross-section of the article;

raising or lowering the first solidified layer to provide a second fluid layer of the composite build material at a surface of the fluid composite build material in the container; and selectively applying energy to the composite build material in the container to solidify at least a portion of the second fluid layer of the composite build material, thereby forming a second solidified layer that defines a second cross-section of the article, the first cross-section and the second cross-section being bonded to one another in a z-direction, wherein the composite build material comprises:
 a carrier ink comprising a curable material;
 pigment particles dispersed in the carrier ink, the pigment particles comprising mica; and
 a colorant dispersed in the carrier ink, the colorant differing from the pigment particles.

2. The method of claim 1, wherein the carrier ink is present in the composite build material in an amount of 80-98% by weight, based on the total weight of the composite build material.

3. The method of claim 1, wherein the curable material comprises one or more species of (meth)acrylates.

4. The method of claim 1, wherein the curable material comprises one or more oligomeric materials.

5. The method of claim 4, wherein the one or more oligomeric materials comprise a urethane (meth)acrylate.

6. The method of claim 1, wherein the pigment particles are present in the composite build material in an amount of 2-8% by weight, based on the total weight of the composite build material.

7. The method of claim 1, wherein the pigment particles have an average diameter of 5-500 μm.

8. The method of claim 1, wherein the pigment particles comprise up to 85% by weight mica, based on the total weight of the pigment particles.

9. The method of claim 1, wherein the pigment particles further comprise $TiO_2$, $Fe_2O_3$, or both.

10. The method of claim 1, wherein the method does not comprise painting, coating, or plating an exterior surface of the article with a metal or metal alloy.

11. The method of claim 1, wherein:
the carrier ink is present in the composite build material in an amount of 85-98% by weight, based on the total weight of the composite build material;
the curable material comprises a mixture of 45-55% by weight of one or more monomeric (meth)acrylates and 45-55% by weight of one or more oligomeric urethane (meth)acrylates, based on the total weight of the curable material;
the pigment particles are present in the composite build material in an amount of 2-8% by weight, based on the total weight of the composite build material;
the pigment particles have an average diameter of 5-500 μm and comprise up to 85% by weight mica, based on the total weight of the pigment particles;
the pigment particles exhibit a gold color;
the colorant is present in the composite build material in an amount of 0.1-2.0% by weight, based on the total weight of the composite build material; and
the colorant exhibits a white color.

12. The method of claim 1, wherein:
the carrier ink is present in the composite build material in an amount of 85-98% by weight, based on the total weight of the composite build material;
the curable material comprises a mixture of 45-55% by weight of one or more monomeric (meth)acrylates and 45-55% by weight of one or more oligomeric urethane (meth)acrylates, based on the total weight of the curable material;
the pigment particles are present in the composite build material in an amount of 2-8% by weight, based on the total weight of the composite build material;
the pigment particles have an average diameter of 5-500 μm and comprise up to 85% by weight mica, based on the total weight of the pigment particles;
the pigment particles exhibit a white color;
the colorant is present in the composite build material in an amount of 0.005-0.05% by weight, based on the total weight of the composite build material; and
the colorant exhibits a black color.

13. The method of claim 1, wherein the composite build material further comprises one or more additives selected from the group consisting of photoinitiators, inhibitors, stabilizing agents, sensitizers, and combinations thereof.

14. The method of claim 1, wherein the composite build material when non-cured exhibits a dynamic viscosity of 400-1000 cP at 30° C.

15. The method of claim 1, wherein a surface of the composite build material when cured exhibits a metallic finish.

* * * * *